US010348825B2

United States Patent
Rao et al.

(10) Patent No.: US 10,348,825 B2
(45) Date of Patent: Jul. 9, 2019

(54) NETWORK PLATFORM-AS-A-SERVICE FOR CREATING AND INSERTING VIRTUAL NETWORK FUNCTIONS INTO A SERVICE PROVIDER NETWORK

(71) Applicant: Verizon Patent and Licensing Inc., Basking Ridge, NJ (US)

(72) Inventors: Ravindra Rao, Sunnyvale, CA (US); Ashay Chaudhary, Redmond, WA (US); Sandeep Sharma, Fremont, CA (US); Ray A. Sears, Capitola, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 722 days.

(21) Appl. No.: 14/271,659

(22) Filed: May 7, 2014

(65) Prior Publication Data
US 2015/0326535 A1  Nov. 12, 2015

(51) Int. Cl.
*H04L 12/24* (2006.01)
*H04L 29/08* (2006.01)
*H04L 29/06* (2006.01)

(52) U.S. Cl.
CPC ...... *H04L 67/1097* (2013.01); *H04L 41/5054* (2013.01); *H04L 63/029* (2013.01); *H04L 63/0272* (2013.01); *H04L 63/0227* (2013.01)

(58) Field of Classification Search
CPC .................................................. H04L 63/0272
See application file for complete search history.

(56) References Cited

U.S. PATENT DOCUMENTS

| | | | | |
|---|---|---|---|---|
| 2006/0129687 A1* | 6/2006 | Goldszmidt | ............ | G06F 9/505 709/229 |
| 2012/0178414 A1* | 7/2012 | Fiatal | .................. | H04M 3/4872 455/406 |
| 2013/0007239 A1* | 1/2013 | Agarwal | .................. | H04L 63/02 709/223 |
| 2013/0210464 A1* | 8/2013 | Mittal | ..................... | H04L 67/18 455/456.5 |
| 2013/0346465 A1* | 12/2013 | Maltz | .................... | G06F 9/5072 709/201 |
| 2014/0101656 A1* | 4/2014 | Zhu | ...................... | H04L 63/0227 718/1 |

(Continued)

OTHER PUBLICATIONS

Wikipedia, "Network as a service" http://en.wikipedia.org/wiki/Network_as_a_service, Sep. 16, 2013, 3 pages.

(Continued)

*Primary Examiner* — Vivek Srivastava
*Assistant Examiner* — Nicholas P Celani

(57) ABSTRACT

One or more devices may receive a service request. The service request may be associated with providing a network service to a service location and may be associated with a service provider network. The one or more devices may create a virtual network function (VNF), associated with providing the network service, based on the service request. The VNF may be created such that the VNF is hosted by the device, and may be configured to provide the network service. The one or more devices may insert the VNF into the service provider network. The VNF may be inserted to interact with a physical device of the service provider network to allow the network service to be provided to the service location.

20 Claims, 11 Drawing Sheets

(56) References Cited

U.S. PATENT DOCUMENTS

2015/0326448 A1* 11/2015 Chaudhary ............ G06Q 20/14
　　　　　　　　　　　　　　　　　　　　　　　705/40
2015/0326451 A1* 11/2015 Rao ........................ G06Q 30/04
　　　　　　　　　　　　　　　　　　　　　　　705/34

OTHER PUBLICATIONS

Harish Vadada, "Network as a Service (NaaS)", http://www.telecom-cloud.net/network-as-a-service/, Jul. 16, 2011, 15 pages.
Wikipedia, "Network Functions Virtualization", http://en.wikipedia.org/wiki/Network_Functions_Virtualization, Apr. 24, 2014, 4 pages.

* cited by examiner

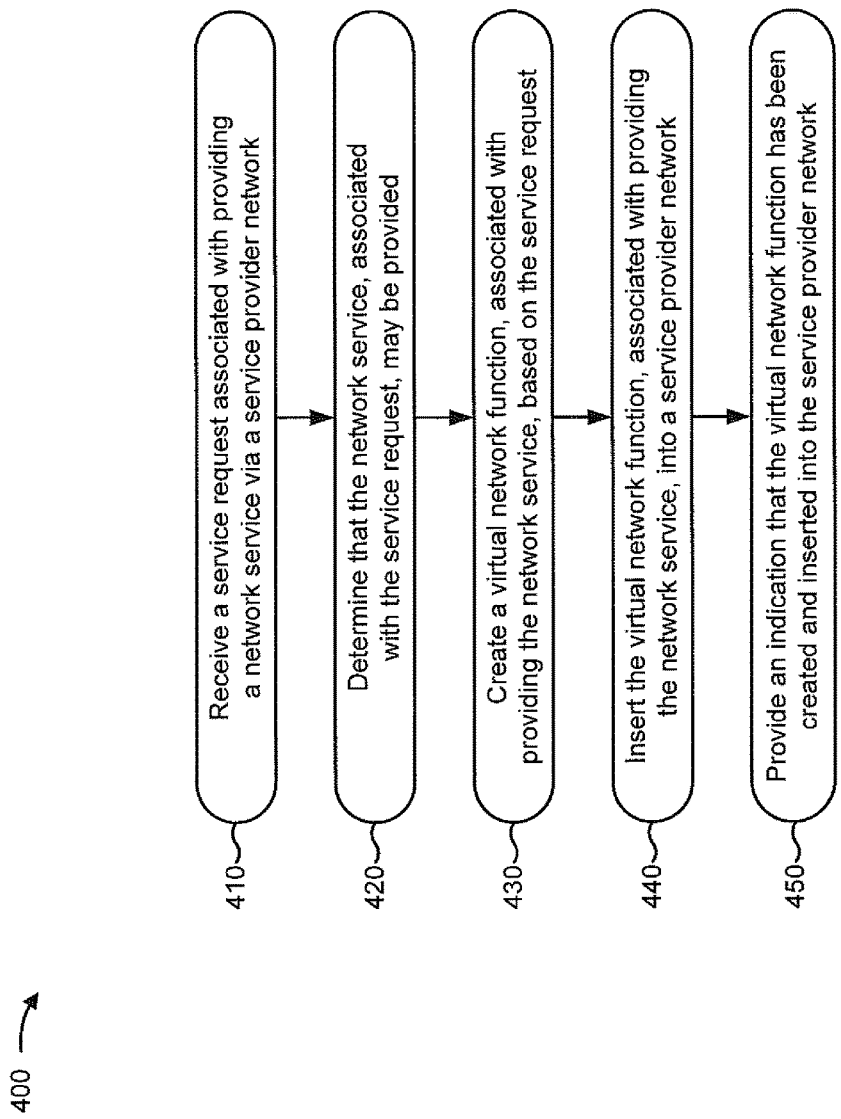

NETWORK PLATFORM-AS-A-SERVICE FOR CREATING AND INSERTING VIRTUAL NETWORK FUNCTIONS INTO A SERVICE PROVIDER NETWORK

BACKGROUND

Network-as-a-Service (NaaS) is a service model that allows a service provider to provide a virtual network service to a third party. In some cases, NaaS may allow the service provider to provide a network service such as a virtual private network (VPN), bandwidth on demand, custom routing, multicast protocols, a security firewall, intrusion detection and prevention, content monitoring and filtering, and/or antivirus protection.

BRIEF DESCRIPTION OF THE DRAWINGS

FIG. 4 is a flow chart of an example process for receiving a service request, associated with providing a network service to a service location using a virtual network function, creating the virtual network function, and inserting the virtual network function into a service provider network such that the network service is provided to the service location;

DETAILED DESCRIPTION OF PREFERRED EMBODIMENTS

The following detailed description of example implementations refers to the accompanying drawings. The same reference numbers in different drawings may identify the same or similar elements.

A service provider, associated with a service provider network, may wish to implement a Network-as-a-Service (NaaS) service model that allows the service provider to provide agile, on-demand, and/or flexible network services (e.g., virtual network services) to a service location associated with a customer. However, provisioning of network services via the service provider network may be hardware based and the service provider network may be a closed system. As such, the service provider may be forced to manually configure, monitor, update, etc. devices included in the service provider network in order to provide the network service. Moreover, updating, modifying, adjusting, etc. the network service based on a request from the customer may be difficult and time consuming (e.g., since an update would require additional manual configuration). Implementations described herein may allow virtual network functions, associated with providing network services, to be created and inserted into a service provider network, and may allow the virtual network functions to be locally managed such that the network services are provided in an agile, on-demand, and/or flexible manner without the need to manually configure, monitor, update, etc. devices included in the service provider network.

Figure 1A:
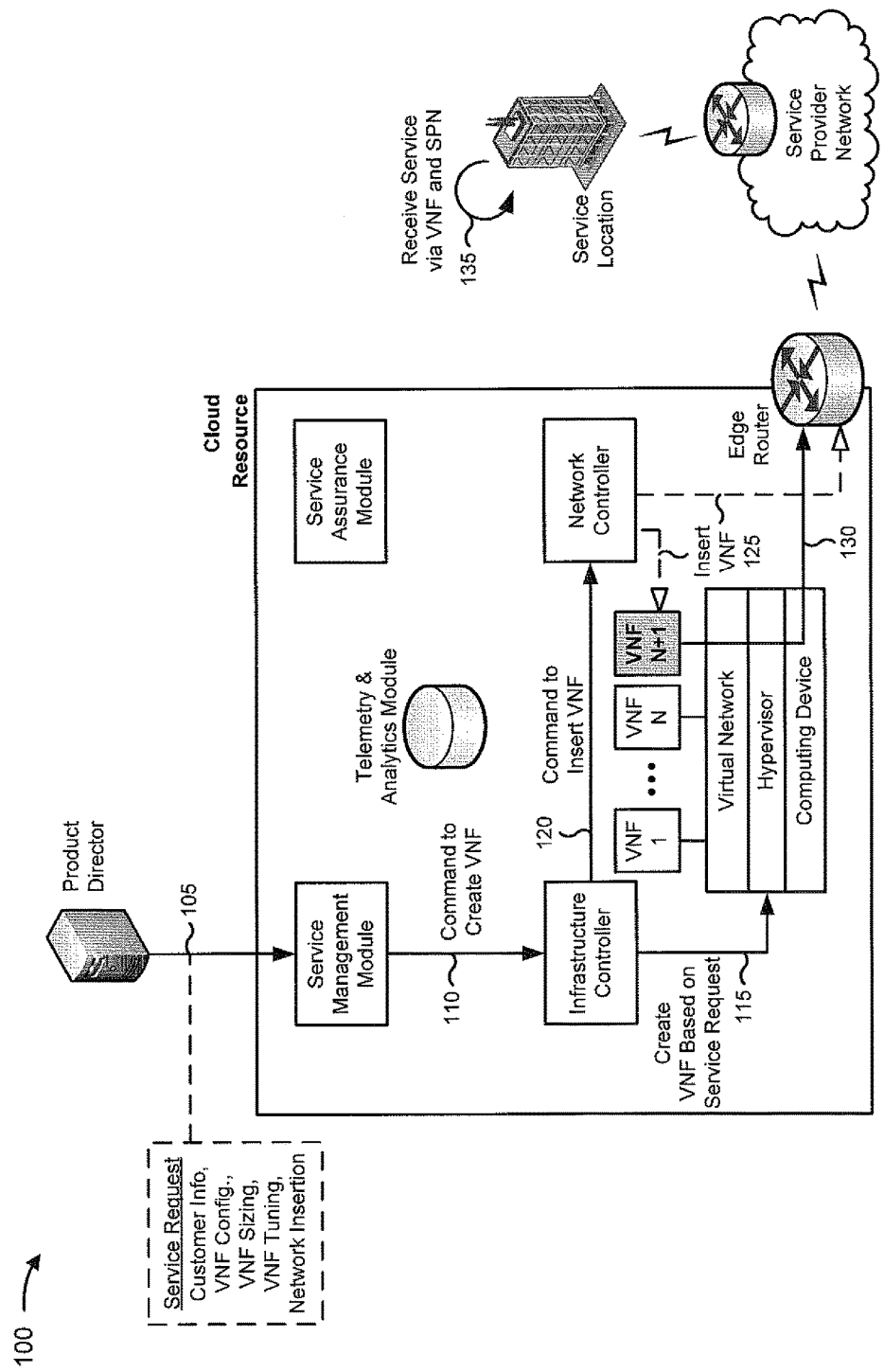
FIGS. 1A and 1B are diagrams of an overview of an example implementation described herein.
Figure 1B:
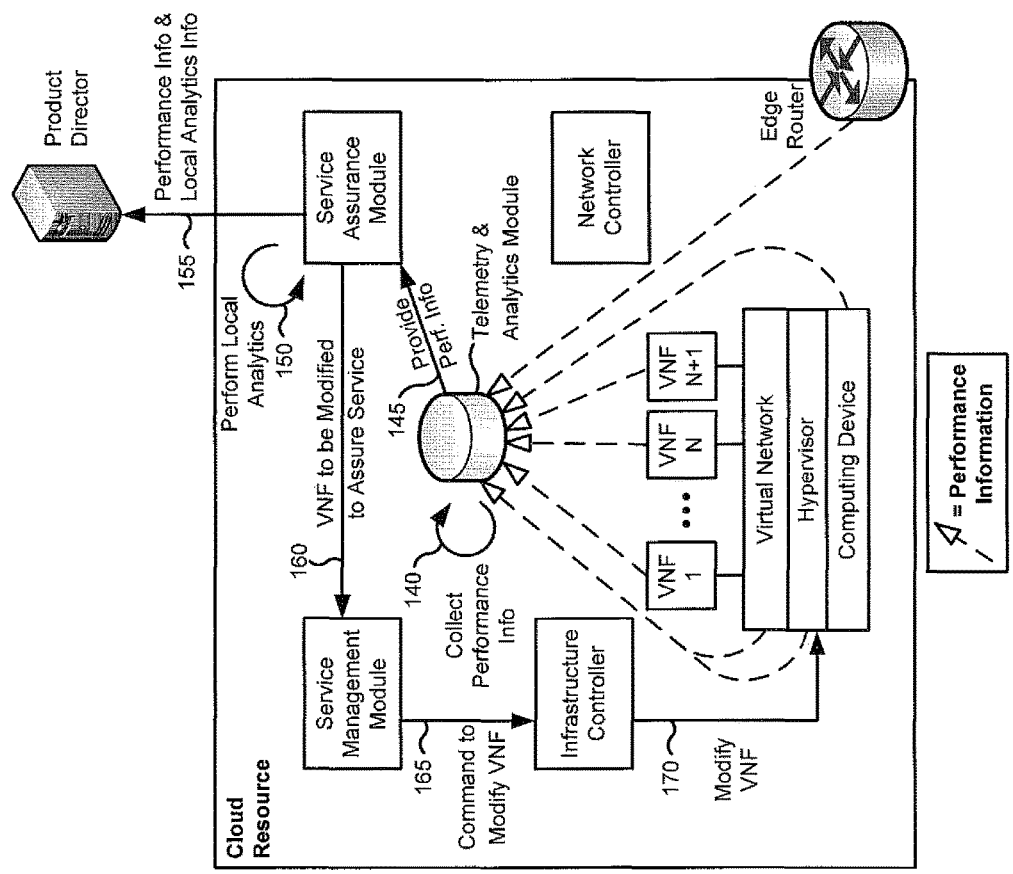

FIGS. 1A and 1B are diagrams of an overview of an example implementation 100 described herein. For the purposes of example implementation 100, assume that a customer, associated with a service provider network, wishes for a network service to be provided to a service location associated with the customer. Further, assume that the customer has provided (e.g., via user interface associated with the service provider network and displayed via a customer device) customer service order information associated with the network service. Finally, assume that a product director, associated with the service provider network, has received the customer service order information, generated a service request based on the customer service order information, and identified a cloud resource (e.g., including one or more computing devices included in a cloud computing environment, etc.) that is to create a virtual network function (VNF), associated with the network service, and insert the VNF into the service provider network.

As shown in FIG. 1A, and by reference number 105, the product director may provide the service request to a service management module of the cloud resource. As shown, the service request may include information associated with the customer, information associated with configuring the VNF that is to provide the network service, sizing information associated with the VNF, tuning information associated with the VNF, network insertion information associated with inserting the VNF into the service provider network, and/or other information associated with creating and/or inserting the VNF that is to provide the network service to the service location.

The service management module may receive the service request and may parse the service request to identify information, associated with creating the VNF, included in the service request. As shown by reference number 110, the service management module may provide, to an infrastructure controller associated with the cloud resource, a command to create the VNF based on the information included in the service request. As shown by reference number 115, the infrastructure controller may create the VNF (e.g., VNF N+1) such that the VNF runs on a computing device that includes a hypervisor and a virtual network associated with the cloud resource. As shown by reference number 120, the infrastructure controller may then provide, to a network controller of the cloud resource, a command to insert the VNF into the service provider network based on the information included in the service request. As shown by reference number 125, the network controller may configure the VNF and an edge router associated with the cloud resource such that the VNF may communicate, via the edge router, with the service provider network, as shown by reference number 130. As shown by reference number 135, the network service may then be provided to the service location via the VNF and the service provider network.

For the purposes of FIG. 1B, assume that the cloud resource hosts the VNF (e.g., VNF N+1) along with multiple other VNFs (e.g., VNF 1 through VNF N) associated with providing network services via the service provider network. Further, assume that each VNF is configured to provide, to a telemetry and analytics module of the cloud resource, performance information associated with each VNF, respectively. Finally, assume that other components of the cloud resource (e.g., the computing device, the virtual network, the hypervisor, the edge router, etc.) are configured to provide performance information, associated with the VNFs, to the telemetry and analytics module.

As shown, the VNFs (e.g., VNF 1 through VNF N+1), the virtual network, the hypervisor, the computing device, and the edge router may provide performance information to the telemetry and analytics module. As shown by reference number 140, the telemetry and analytics module may collect the performance information and, as shown by reference number 145, may provide the performance information (e.g., in the form of a correlated data set) to a service assurance module of the cloud resource. As shown by reference number 150, the service assurance module may perform, based on the performance information, local analytics to assure that network services are being adequately provided by the cloud resource (e.g., in accordance with a service level agreements (SLA) associated with the network services). As shown by reference number 155, the service assurance module may provide the performance information and/or the local analytics information to the product director (e.g., such that the product director may perform global analytics associated with multiple cloud resources managed by the product director).

For purposes of example implementation 100, assume that the service assurance module determines, based on local analytics information, that one or more VNFs (e.g., included in VNF 1 through VNF N+1) are to be modified to assure that network services are adequately provided. As shown by reference number 160, the service assurance module may provide, to the service management module, information indicating that the one or more VNFs are to be modified.

As shown by reference number 165, the service management module may then provide, to the infrastructure controller, modification information associated with modifying the one or more VNFs. As shown by reference number 170, the infrastructure controller may receive the modification information and may modify the one or more VNFs, accordingly. In some implementations, the infrastructure controller may communicate with the network controller to cause the network controller to modify the one or more VNFs. The process described in FIG. 1B may be repeated such that the performance of VNFs hosted by the cloud resource are continuously monitored and modified to assure that network services are adequately provided.

In this way, virtual network functions may be created and inserted into a service provider network, and the virtual network functions may be locally managed such that the network services are provided in an agile, on-demand, and/or flexible manner without the need to manually configure, monitor, update, etc. devices included in the service provider network.

Figure 2:
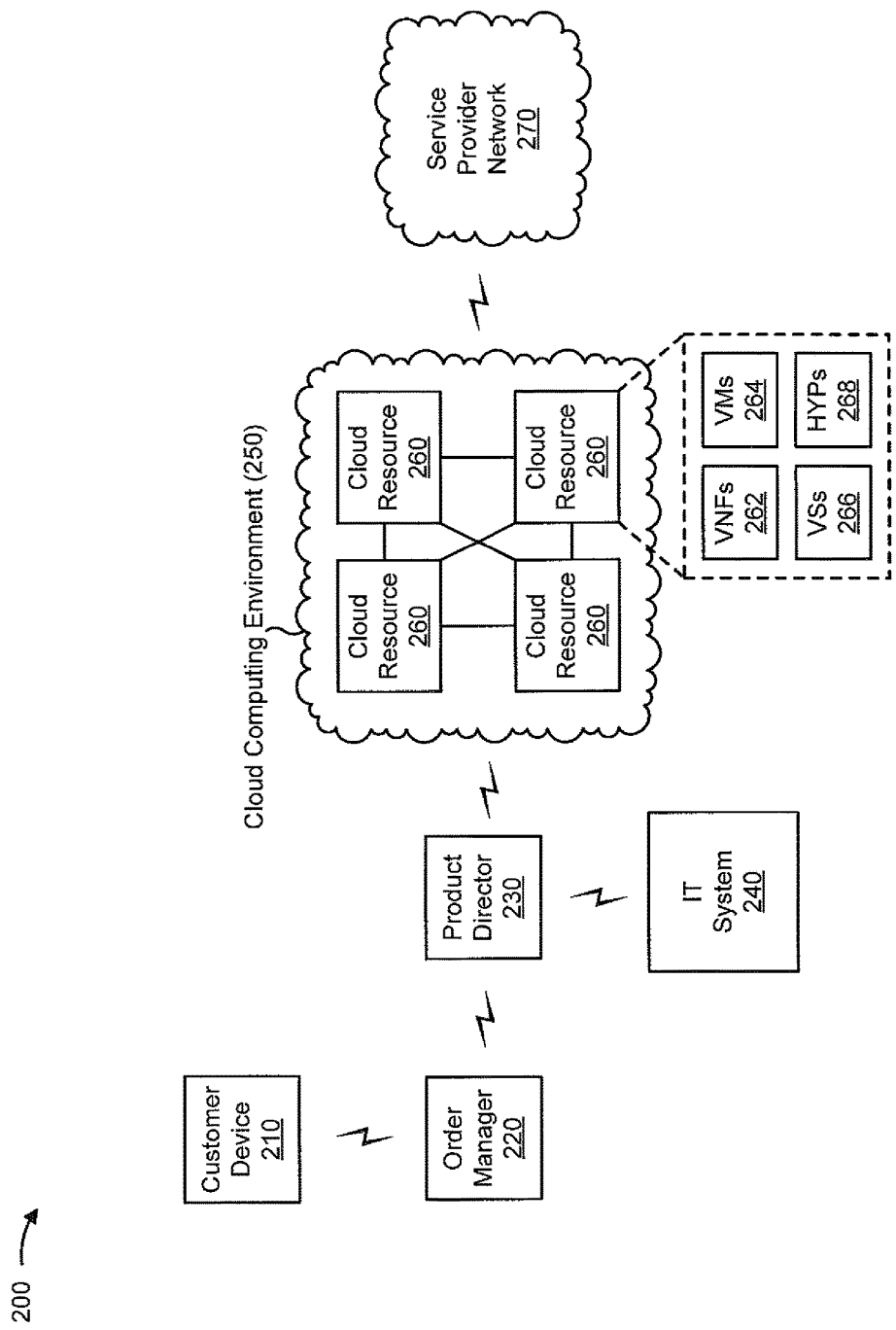
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a customer device 210, an order manager 220, a product director 230, an information technology (IT) system 240, a cloud computing environment 250, and a service provider network 270. Devices of environment 200 may interconnect via wired connections, wireless connections, or a combination of wired and wireless connections.

Customer device 210 may include a device capable of receiving, processing, and/or providing information (e.g., customer service order information). For example, customer device 210 may include a mobile phone (e.g., a smart phone, a radiotelephone, etc.), a computing device (e.g., a laptop computer, a tablet computer, a handheld computer, a gaming device, etc.) a network device (e.g. Customer Premises Equipment (CPE), a router, etc.), or a similar device. In some implementations, customer device 210 may be host an application (e.g., a user input web portal, a cloud services portal, etc.), that may allow the user to provide customer service order information associated with a network service. In some implementations, customer device 210 may include a communication interface that allows customer device 210 to receive (e.g., based on user input) customer service order information associated with providing a network service to a service location. In some implementations, customer device 210 may include a communication interface that allows customer device 210 to submit a customer service order to an order manager through a defined method. Additionally, or alternatively, customer device 210 may be capable of providing the customer service order information to another device in environment 200 (e.g., order manager 220).

Order manager 220 may include one or more devices capable of receiving, storing, processing, generating, and/or providing customer service order information. For example, order manager 220 may include a server device or a collection of server devices. In some implementations, order manager 220 may include a communication interface that allows order manager 220 to receive customer service order information from customer device 210 and/or forward the customer service order information to other devices in environment 200 (e.g., product director 230). In some implementations, order manager 220 may include a device capable of receiving the customer service order information, verifying the customer service order information, and/or authenticating a customer associated with the customer service order information.

Product director 230 may include one or more devices capable of receiving, storing, processing, generating, and/or providing customer service order information, context information associated with the customer service order information, provisioning details associated with the customer service order information, and/or another type of information. For example, order manager 220 may include a server device or a collection of server devices. In some implementations, product director 230 may be capable of communicating with order manager 220 to receive customer service order information. Additionally, or alternatively, product director 230 may be capable of communicating with IT system 240 to determine context information associated with the customer service order information received from order manager 220. Additionally, or alternatively, product director 230 may be capable of generating a service request based on the context information received from IT system 240, and providing the service request to cloud resource 260.

In some implementations, product director 230 may be associated with multiple cloud resources 260. For example, product director 230 may be configured to manage network services provided via a group of cloud resources 260. In some implementations, each product director 230 could be associated with a respective geographic region and cloud resources 260 also associated with that respective geographic region. Additionally, or alternatively, product director 230 may be capable of identifying a particular cloud resource 260 that is to create and insert a network service associated with customer service order information received from order manager 220. In some implementations, product director 230 may be capable of receiving performance information and/or local analytics information from the multiple cloud resources 260, and performing global service assurance associated with the multiple cloud resources 260.

IT system 240 may include one or more devices capable of receiving, storing, processing, generating, and/or providing context information and/or another type of information. For example, IT system 240 may include a server device or a collection of server devices. In some implementations, IT system 240 may be capable of communicating with product director 230 to provide context information associated with customer service order information. In some implementations, IT system 240 may include one or more devices (e.g., server devices) that are configured to store context information and/or to provide the context information to product director 230.

Cloud computing environment 250 may include an environment that delivers computing as a service, whereby shared resources, services, etc. may be provided to customer device 210. Cloud computing environment 250 may provide computation, software, data access, storage, etc. services that do not require end-user (e.g., customer device 210) knowledge of a physical location and configuration of system(s) and/or device(s) that deliver the services.

As shown, cloud computing environment 250 may include a group of cloud resources 260 (referred to collectively as "cloud resources 260" and individually as "cloud resource 260").

Cloud resource 260 may include one or more computing devices. In some implementations, cloud resource 260 may provide network services to customer device 210. The network services may use compute instances executing in cloud resource 260, storage devices provided in cloud resource 260, data transfer operations executed by cloud resource 260, etc. In some implementations, cloud resource 260 may communicate with other cloud resources 260 via wired connections, wireless connections, or a combination of wired and wireless connections. In some implementations, one or more cloud resources 260 may be assigned (e.g., by a device associated with a service provider, etc.) to receive, process, store and/or provide traffic, associated with a customer, in accordance with an agreement (e.g., a service level agreement ("SLA")).

In some implementations, cloud resource 260 may include a platform for the delivery of network services (e.g., cloud resource 260 may be configured to implement a Network Platform-as-a-Service (NPaaS) service model). For example, cloud resource 260 may include software associated with creating a VNF, inserting the VNF into service provider network 270, determining performance information associated with the VNF, performing local analytics associated with the performance information, modifying the VNF to assure provisioning of a network service associated with the VNF, and/or performing another function. For example, cloud resource 260 may host one or more software modules, such as a service management module, a service assurance module, a telemetry and analytics module, an infrastructure controller, and/or a network controller. In some implementations, these modules may cooperate in order to locally manage multiple VNFs operating on cloud resource 260.

In some implementations, cloud resource 260 may be capable of receiving a service request associated with providing a network service, creating a VNF associated with the network service (e.g., within cloud resource 260), and inserting the VNF into service provider network 270 (e.g., such that the network service is provided via the VNF). In some implementations, cloud resource 260 may be capable of determining performance information associated with network services provided via VNFs running on cloud resource 260, and performing local service assurance based on the performance information and/or local analytics information determined by cloud resource 260.

As further shown in FIG. 2, cloud resource 260 may include a group of resources, such as one or more virtual network functions ("VNFs") 262, one or more virtual machines ("VMs") 264, virtualized storage ("VSs") 266, one or more hypervisors ("HYPs") 268, etc.

VNF 262 may include one or more network functions that may be provided to or accessed by customer device 210. VNF 262 may eliminate a need to install and execute the network functions on customer device 210 and/or another device associated with customer device 210. For example, VNF 262 may include a network function associated with a firewall, a load balancer, malware detection, and/or any other network function capable of being provided via cloud computing environment 250. In some implementations, one VNF 262 may send/receive information to/from one or more other VNF 262, via virtual machine 264.

Virtual machine 264 may include a software implementation of a machine (e.g., a computer) that executes programs like a physical machine. Virtual machine 264 may be either a system virtual machine or a process virtual machine, depending upon use and degree of correspondence to any real machine by virtual machine 264. A system virtual machine may provide a complete system platform that supports execution of a complete operating system ("OS"). A process virtual machine may execute a single program, and may support a single process. In some implementations, virtual machine 264 may execute on behalf of a customer (e.g., customer device 210) to provide a network service to a service location associated with the customer. In some implementations, a VNF may correspond to one or more VNFs 262, virtual machines 264, virtualized storages 266, and/or hypervisors 268.

Virtualized storage 266 may include one or more storage systems and/or one or more devices that use virtualization techniques within the storage systems or devices of cloud resource 260. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 268 may provide hardware virtualization techniques that allow multiple virtual machines 264 to execute concurrently on a host computer, such as computing resource 260. Hypervisor 268 may present a virtual operating platform to virtual machines 264, and may manage the execution of the virtual machines 264. Multiple instances of a variety of virtual machines 264 may share virtualized hardware resources. Hypervisor 268 may provide an interface to infrastructure as a service provided by cloud computing environment 250.

Service provider network 270 may include one or more wired and/or wireless networks associated with a service provider. For example, service provider network 270 may include a cellular network, a public land mobile network (PLMN), a second generation (2G) network, a third generation (3G) network, a fourth generation (4G) network, a fifth generation (5G) network, a long term evolution (LTE)

network, and/or a similar type of network. Additionally, or alternatively, service provider network 270 may include a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a satellite network, a cloud computing network, and/or a combination of these or other types of networks. In some implementations, service provider network 270 may include network devices (e.g., base stations, gateways, routers, modems, switches, network interface cards ("NIC"), hubs, bridges, servers, etc.) that may be configured to provide a network service to a service location associated with a customer.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
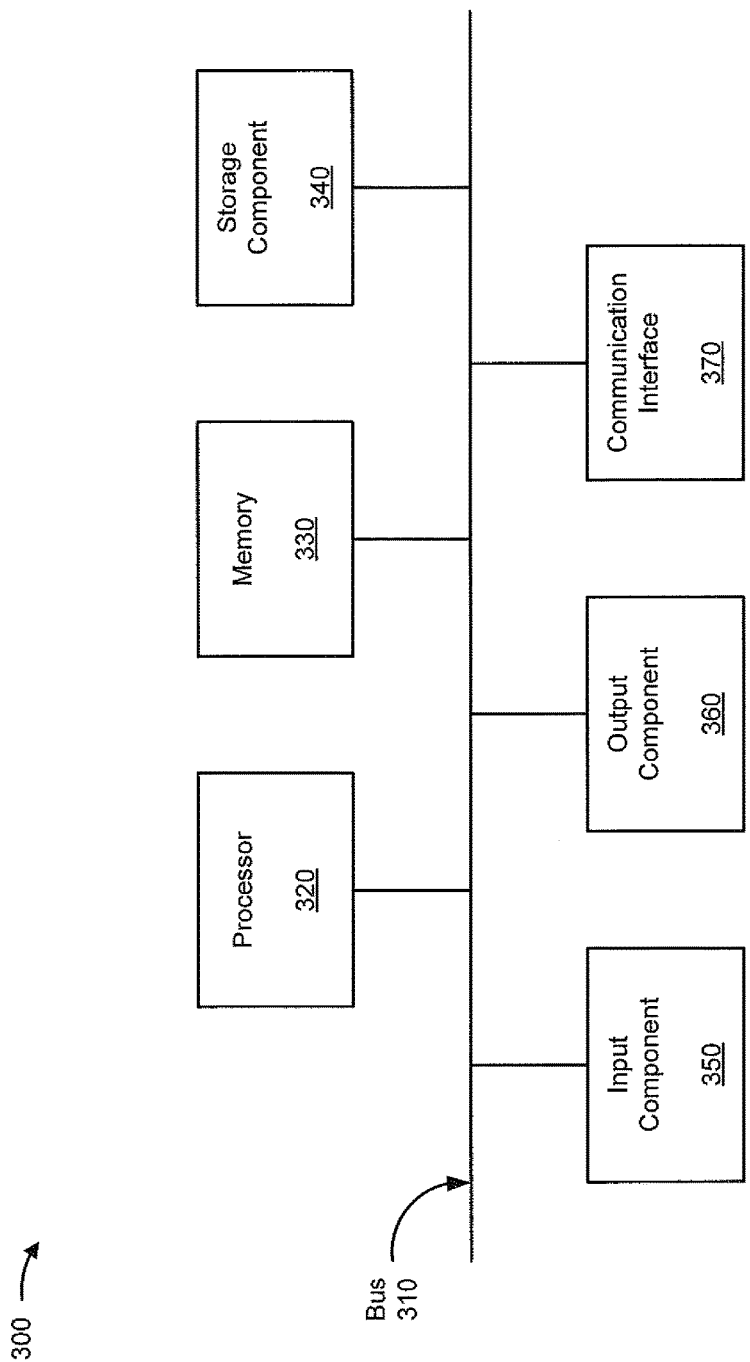
FIG. 3 is a diagram of example components of one or more devices of FIG. 2.

FIG. 3 is a diagram of example components of a device 300. Device 300 may correspond to customer device 210, order manager 220, product director 230, one or more devices of IT system 240, and/or cloud resource 260. In some implementations, customer device 210, order manager 220, product director 230, IT system 240, and/or cloud resource 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for receiving a service request, associated with providing a network service to a service location using a virtual network function, creating the virtual network function, and inserting the virtual network function into a service provider network such that the network service is provided to the service location. In some implementations, one or more process blocks of FIG. 4 may be performed by cloud resource 260. In some implementations, one or more process blocks of FIG. 4 may be performed by another device or a group of devices separate from or including cloud resource 260, such as another device include in environment 200.

As shown in FIG. 4, process 400 may include receiving a service request associated with providing a network service via a service provider network (block 410). For example, cloud resource 260 (e.g., a service management module of cloud resource 260) may receive, from product director 230, a service request associated with providing a network service via a service provider network. In some implementations, cloud resource 260 may receive the service request after product director 230 provides the service request to cloud resource 260.

A service request may include information, associated with a VNF that is to provide a network service, that has been prepared in a format that may be used by cloud resource 260 to create the VNF and insert the VNF into service provider network 270. In some implementations, the service request may be generated in a manner (e.g., using a particular protocol, in a particular format, etc.) such that product director 230 need only provide a single service request to cloud resource 260 (e.g., rather than providing multiple service requests) to cause cloud resource 260 to create and insert the VNF.

In some implementations, the service request may include information determined by product director 230 (e.g., context information associated with the network service, provisioning details associated with the network service, etc.). For example, the service request may include context information associated with the customer (e.g., a customer name, a customer ID, a customer account number, a username, a password, etc.), configuration information associated with the VNF (e.g., a service type of the network service, a quantity of devices to be provided with the network service, etc.), sizing information associated with the VNF (e.g., an amount of computing resources, an amount of RAM, an amount of storage, etc.), tuning information associated with the VNF (e.g., when the network service requires a non-default VNF), network insertion information associated with providing the network service via the VNF (e.g., a port identifier, routing information, virtual routing and forwarding information, etc.). Additionally, or alternatively, the service request may include other information associated with the VNF.

In some implementations, the service request may include information associated with multiple VNFs. For example, the service request may include information indicating that cloud resource 260 is to create and insert multiple VNFs, associated with one or more network services, to form a network service chain (e.g., such that the multiple VNFs may interact with one another) associated with providing the one or more network services.

In some implementations, cloud resource 260 may parse the service request after receiving the service request. For example, cloud resource 260 may receive the service request from product director 230, and may parse the service request to determine the information included in the service request. In this example, cloud resource 260 may determine the information included in the service request, and may create the VNF based on the information, as discussed below.

As further shown in FIG. 4, process 400 may include determining that the network service, associated with the service request, may be provided (block 420). For example, cloud resource 260 (e.g., the service management module of cloud resource 260) may determine that the network service, associated with the service request, may be provided by cloud resource 260. In some implementations, cloud resource 260 may determine that the network service may be provided after cloud resource 260 receives the service request. Additionally, or alternatively, cloud resource 260 may determine that the network service may be provided after cloud resource 260 parses the service request to determine the information associated with creating and inserting the VNF.

In some implementations, cloud resource 260 may determine that cloud resource 260 may provide the network service. For example, cloud resource 260 may receive the service request and may determine (e.g., based on performance information and/or local analytics information, based on stored information associated with VNFs hosted by cloud resource 260, etc.) whether cloud resource 260 has sufficient computing resources (e.g., processing power, RAM, memory storage space, etc.) available to provide the network service. If cloud resource 260 has sufficient computing resources available, then cloud resource 260 may create the VNF, as discussed below. Alternatively, if cloud resource 260 does not have sufficient computing resources available, then cloud resource 260 may provide, to product director 230, an indication that cloud resource 260 is not available to provide the network service. Product director 230 may then identify another cloud resource 260 to provide the network service, and may provide the service request to the other cloud resource 260.

As further shown in FIG. 4, process 400 may include creating a virtual network function, associated with providing the network service, based on the service request (block 430). For example, cloud resource 260 (e.g., an infrastructure controller of cloud resource 260) may create a VNF, associated with providing the network service, based on the service request. In some implementations, cloud resource 260 may create the VNF after cloud resource 260 receives the service request from product director 230. Additionally, or alternatively, cloud resource 260 may create the VNF after cloud resource 260 determines that cloud resource 260 may provide the network service. Additionally, or alternatively, cloud resource 260 may create the VNF after cloud resource 260 parses the service request received from product director 230.

In some implementations, when creating the VNF, cloud resource 260 may create a VNF that is configured to provide the network service associated with the service request. In some implementations, the VNF may be created based on the service request received by cloud resource 260. Additionally, or alternatively, cloud resource 260 may configure one or more computing devices, associated with cloud resource 260, to implement the VNF.

In some implementations, the infrastructure controller of cloud resource 260 may create the VNF, and may provide, to a network controller of cloud resource 260, an indication that the network controller is to configure and/or insert the VNF into service provider network 270. In some implementations, the infrastructure controller may provide information associated with inserting the VNF into service provider network 270, such as context information associated with inserting the VNF into service provider network 270.

As further shown in FIG. 4, process 400 may include inserting the virtual network function, associated with providing the network service, into a service provider network (block 440). For example, cloud resource 260 (e.g., a network controller of cloud resource 260) may insert the VNF into service provider network 270 associated with providing the network service. In some implementations, cloud resource 260 may insert the VNF into service provider network 270 after cloud resource 260 creates the VNF.

In some implementations, when inserting the VNF into service provider network 270, cloud resource 260 may configure the VNF and/or one or more other devices (e.g., one or more physical devices included in service provider network 270, one or more virtual devices associated with cloud resource 260, etc.) such that the VNF may communicate with service provider network 270. For example, cloud resource 260 may insert the VNF by configuring the VNF to receive and/or provide traffic from and/or to a virtual edge router associated with cloud resource 260, by instructing the virtual edge router to receive, from service provider network 270, traffic destined for the service location, by instructing the virtual edge router to receive traffic provided from the service location, by instructing a physical router included in service provider network 270 to provide traffic, destined for the service location, to the virtual edge router (e.g., before providing the traffic to the service location), or by acting in another manner. In other words, cloud resource 260 may insert the VNF into service provider network 270 such that the VNF may interact with physical devices (e.g., routers, switches, etc.) included in service provider network 270 to provide the network service to the service location.

In some implementations, the network controller of cloud resource 260 may insert the VNF into service provider network 270, and may notify a telemetry and analytics module of cloud resource 260 and/or a service assurance module of cloud resource 260 that the VNF has been inserted into service provider network 270 (e.g., such that the telemetry and analytics module and/or the service assurance module may begin to receive performance information associated with the VNF, may begin to perform local analytics associated with the VNF, etc.).

As further shown in FIG. 4, process 400 may include providing an indication that the virtual network function has been created and inserted into the service provider network (block 450). For example, cloud resource 260 (e.g., the service management module of cloud resource 260, the network controller of cloud resource 260) may provide an indication that the VNF has been created and inserted into the service provider network. In some implementations, cloud resource 260 may provide the indication after cloud resource 260 inserts the VNF into service provider network 270. Additionally, or alternatively, cloud resource 260 may provide the indication after cloud resource 260 creates the VNF.

In some implementations, cloud resource 260 may provide the indication to product director 230. For example, the network controller of cloud resource 260 may insert the VNF and may provide, to the service management module of cloud resource 260, an indication that the VNF has been inserted into service provider network 270. The service management module may then provide, to product director 230, an indication that the VNF was successfully created and inserted into service provider network 270. Product director 230 may receive the indication, and may cause billing for the network service to be initiated.

In this way, cloud resource 260 may create a VNF based on a service request, and may insert the VNF into service provider network 270 such that a network service, associated with the VNF, is provided to the service location (e.g., such that the VNF interacts with one or more physical devices included in service provider network 270 to provide the network service).

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

Figure 5A:
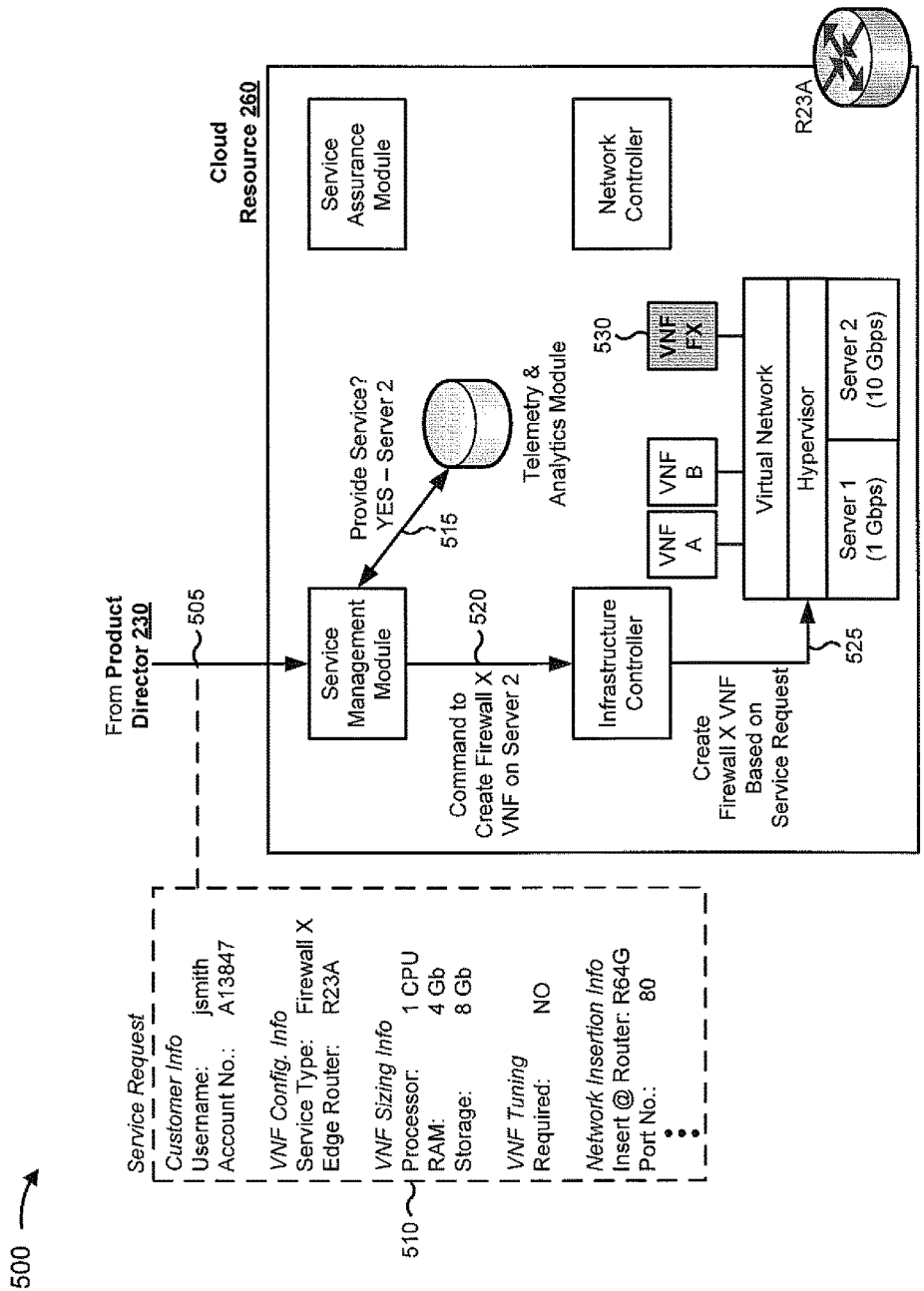
FIGS. 5A-5C are diagrams of an example implementation relating to the example process shown in FIG. 4.
Figure 5B:
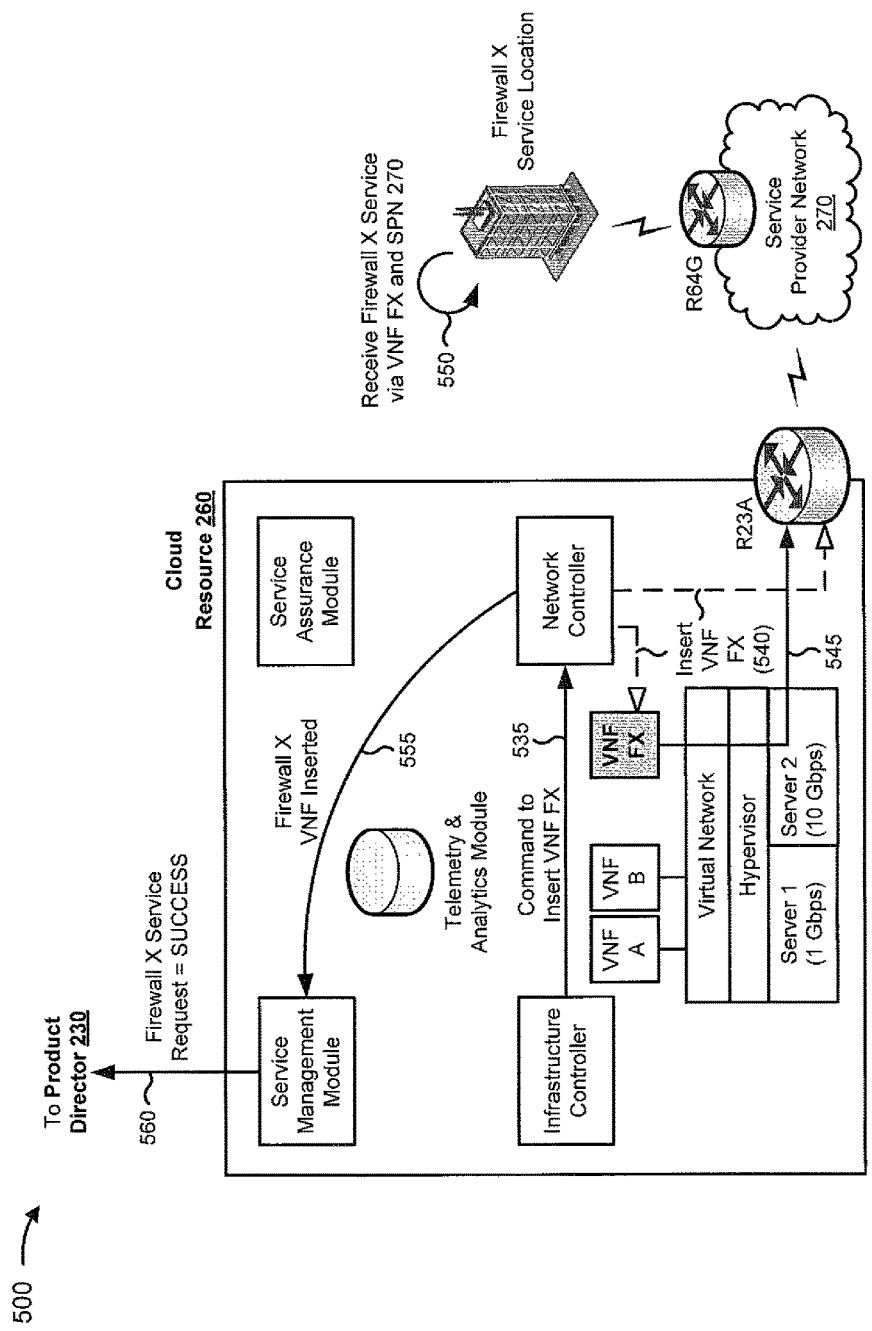
Figure 5C:
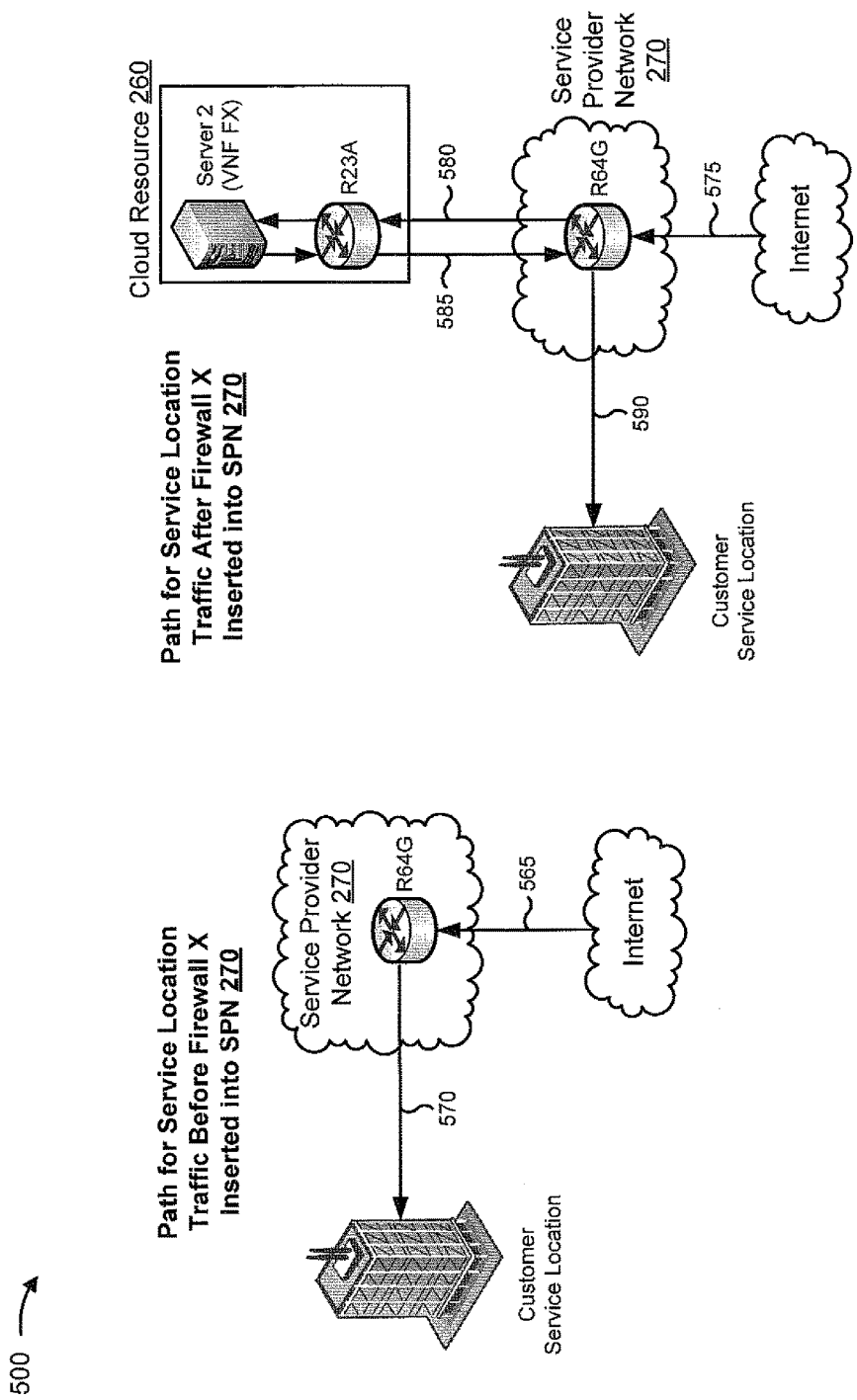

FIGS. 5A-5C are diagrams of an example implementation 500 relating to example process 400 shown in FIG. 4. For the purposes of example implementation 500, assume that a customer, John Smith, has provided, via customer device 210, customer service request information associated with providing a Firewall X network service to a service location. Further, assume that customer device 210 has provided the customer service order information (e.g., via order manager 220) to product director 230. Also, assume that product director 230 has generated a service request based on the customer service order information that includes information associated with creating a Firewall X VNF and inserting the Firewall X VNF into service provider network 270 such that the Firewall X network service is provided to the service location. Finally, assume that product director 230 has identified cloud resource 260 that is to host the Firewall X VNF.

As shown in FIG. 5A, and by reference number 505, product director 230 may provide the Firewall X service request to a service management module of cloud resource 260. As shown by reference number 510, the Firewall X service request may contain information associated with the customer (e.g., Username: jsmith, Account No.: A13847), configuration information associated with the VNF (e.g., Service Type: Firewall X, Edge Router: R23A), VNF sizing information (e.g., Processors: 1 CPU, RAM: 4 Gb, Storage: 8 Gb), information indicating that the VNF does not require tuning (e.g., Required: NO), network insertion information (e.g., Insert @ Router: R64G, Port No. 80), and/or additional information associated with creating and/or inserting the VNF. As shown by reference number 515, the service management module may determine (e.g., based on information stored by the telemetry and analytics module) that cloud resource 260 has sufficient computing resources available to host the Firewall X VNF on a server device, associated with cloud resource 260, identified as server 2.

As shown by reference number 520, the service management module may provide, to an infrastructure controller of cloud resource 260, a command to create the Firewall X VNF on server 2. In some implementations, the command may include the information included in the service request. As shown by reference number 525, the infrastructure controller may instruct a hypervisor, associated with cloud resource 260, to create the Firewall X VNF (e.g., VNF FX) on server 2. As shown by reference number 530, a hypervisor may create the Firewall X VNF such that the Firewall X VNF operates on server 2 via the hypervisor and a virtual network.

As shown in FIG. 5B, and by reference number 535, the infrastructure controller may provide, to the network controller of cloud resource 260, a command to insert the Firewall X VNF into service provider network 270 (e.g., such that the Firewall X network service is provided to the service location). In some implementations, the command may include the context information included in the service request. As shown by reference number 540, the network controller may configure the Firewall X VNF and an edge router associated with cloud resource 260 (e.g., R23A) such that the Firewall X VNF may interact, via router R23A, with a physical router included in service provider network 270, identified as R64G (as shown by reference number 545). Similarly, the network controller may configure router R64G, included in service provider network 270, such that router R64G may interact, via router R23A, with the Firewall X VNF. As shown by reference number 550, the Firewall X network service may then be provided to the service location via the Firewall X VNF, router R23A, router R64G, and service provider network 270.

As shown by reference number 555, the network controller may provide, to the service management module, an indication that the Firewall X VNF has been successfully created and inserted into service provider network 270. As shown by reference number 560, the service management module may then provide, to product director 230, information indicating that the Firewall X VNF was successfully created and inserted into service provider network 270.

An illustration of the effect of inserting the Firewall X VNF into service provider network 270 is shown in FIG. 5C.

As shown in the left portion of FIG. 5C, before the Firewall X VNF is inserted into service provider network 270, traffic destined for the service location may travel from an external source (e.g., the Internet) to router R64G included in service provider network 270 (reference number 565), and from router R64G to the service location (reference number 570).

As shown in the right portion of FIG. 5C, after the Firewall X VNF is inserted into service provider network 270, traffic destined for the service location may travel from the Internet to router R64G included in service provider network 270 (reference number 575), and from router R64G to server 2 (e.g., hosting the Firewall X VNF) via router R23A (reference number 580). The Firewall X VNF may provide the Firewall X network service to the traffic, the traffic may travel from server 2 (e.g., via router R23A) back to router R64G (reference number 585), and that traffic may travel from router R64G to the service location (reference number 590).

In other words, cloud resource 260 may insert the Firewall X VNF into service provider network 270 by (1) instructing router R64G to send traffic, associated with the customer, to the Firewall X VNF via router R23A (2) configuring the Firewall X VNF to process the traffic and send the processed traffic back to router R64G via router R23A, and (3) by instructing router R64G to send the processed traffic received from the Firewall X VNF to the service location. In this way, the Firewall X VNF may be inserted into service provider network 270 such that the Firewall X VNF interacts with physical devices included in service provider network 270 to provide the Firewall X network service to the service location.

As indicated above, FIGS. 5A-5C are provided merely as an example. Other examples are possible and may differ from what was described with regard to FIGS. 5A-5C.

Figure 6:
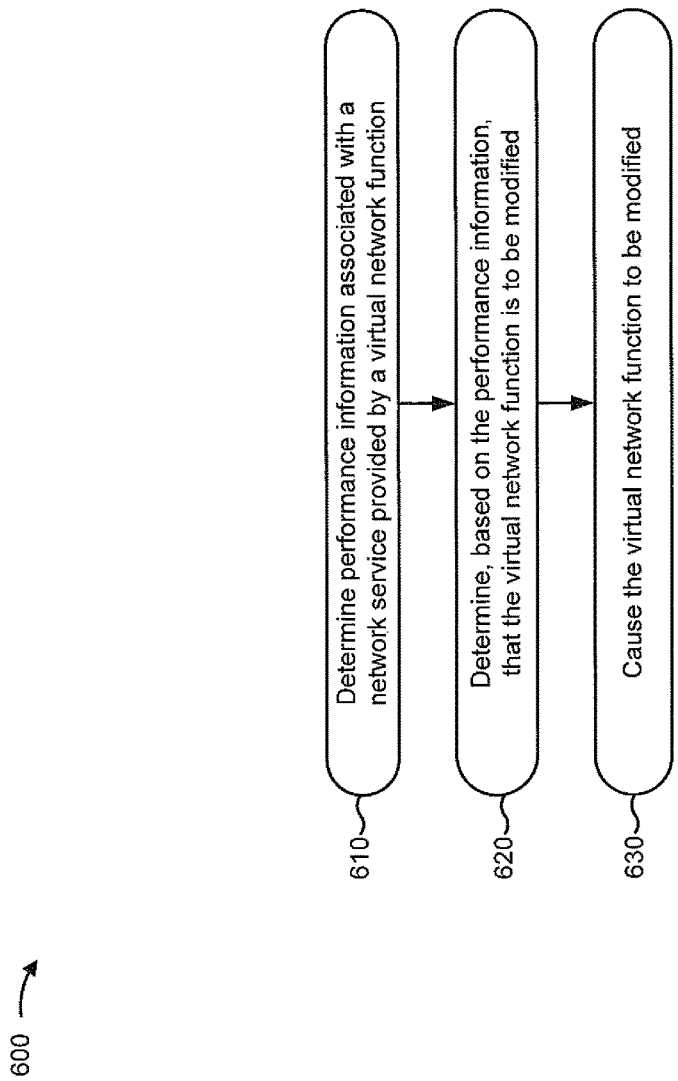
FIG. 6 is a flow chart of an example process for receiving performance information, associated with a virtual network function, and causing the virtual network function to be modified based on the performance information such that a network service, associated with the virtual network function, may be adequately provided.

FIG. 6 is a flow chart of an example process 600 for receiving performance information, associated with a virtual network function, and causing the virtual network function to be modified based on the performance information such that a network service, associated with the virtual network function, may be adequately provided. In some implementations, one or more process blocks of FIG. 6 may be performed by cloud resource 260. In some implementations, one or more process blocks of FIG. 6 may be performed by another device or a group of devices separate from or including cloud resource 260, such as another device include in environment 200.

As shown in FIG. 6, process 600 may include determining performance information associated with a network service provided by a virtual network function (block 610). For example, cloud resource 260 (e.g., a telemetry and analytics module of cloud resource 260) may determine performance information associated with a network service provided by a VNF running on cloud resource 260. In some implementations, cloud resource 260 may determine the performance information when the VNF provides the performance information. Additionally, or alternatively, cloud resource 260 may determine the performance information when another component, network resource, computing device, etc., associated with cloud resource 260, provides the performance information. Additionally, or alternatively, cloud resource 260 may determine the performance information when cloud resource 260 requests the performance information.

Performance information, associated with a VNF, may include information associated with one or more performance metrics associated with the VNF. For example, the performance information may include an amount of computing resources consumed by the VNF, an amount of RAM used by the VNF, an amount of memory storage used by the VNF, an amount of bandwidth used by the VNF, and/or another type of performance metric.

In some implementations, cloud resource 260 may determine the performance information in real-time, on a periodic basis (e.g., every 5 seconds, every 30 seconds, etc.), or in another manner. In some implementations, cloud resource 260 may determine performance information from multiple VNFs hosted by cloud resource 260 (e.g., when cloud resource 260 hosts the multiple VNFs). Additionally, or alternatively, cloud resource 260 may determine performance information, associated with the VNF, based on performance information provided by another component, network resource, and/or computing device associated with cloud resource 260, such as a processor, a hypervisor, a router, a virtual network, a virtual machine, etc. Additionally, or alternatively, cloud resource 260 may determine performance information associated with another component, network resource, and/or computing device associated with cloud resource 260, such as a processor, a hypervisor, a router, a virtual network, a virtual machine, etc. In some implementations, the performance information may be determined at different time granularities (e.g., first performance information, associated with a first VNF, may be determined every 1 second, while second performance information, associated with a second VNF, may be determined every 5 seconds, etc.)

As further shown in FIG. 6, process 600 may include determining, based on the performance information, that the virtual network function is to be modified (block 620). For example, cloud resource 260 (e.g., a service assurance module of cloud resource 260) may determine, based on the performance information, that the VNF is to be modified. In some implementations, cloud resource 260 may determine that the VNF is to be modified after cloud resource 260 determines the performance information associated with the VNF. Additionally, or alternatively, cloud resource 260 may determine that the VNF is to be modified after cloud resource 260 performs local analytics based on the performance information, as discussed below.

In some implementations, cloud resource 260 may determine that the VNF is to be modified based on the performance information. For example, cloud resource 260 may determine performance information associated with one or more VNFs hosted by cloud resource 260, and cloud resource 260 may perform (e.g., using a local analytics algorithm, a local analytics model, etc.) local analytics based on the performance information to determine local analytics information (e.g., predictive workload balancing, usage trends, etc.).

In this example, the local analytics information may indicate a manner in which one or more of the VNFs are to be modified in order to assure that the VNFs are adequately providing their respective network services. In some implementations, cloud resource 260 may determine modification information (e.g., information indicating a manner in which a VNF is to be modified) based on the local analytics information. Additionally, or alternatively, the local analytics information may be provided to another device associated with service provider network 270, such as product director 230.

As further shown in FIG. 6, process 600 may include causing the virtual network function to be modified (block 630). For example, cloud resource 260 (e.g., the service assurance module of cloud resource 260, the service management module of cloud resource 260) may cause the VNF to be modified. In some implementations, cloud resource

260 may cause the VNF to be modified after cloud resource 260 determines that the VNF is to be modified (e.g., after the service assurance module performs local analytics based on the performance information). Additionally, or alternatively, cloud resource 260 may cause the VNF to be modified after cloud resource 260 determines modification information based on a result of performing the local analytics.

In some implementations, when modifying the VNF, cloud resource 260 may modify a configuration of the VNF, relocate the VNF (e.g., to another computing device associated with cloud resource 260), or otherwise change, adjust, or alter the VNF. In some implementations, cloud resource 260 may cause the VNF to be modified by providing a command associated with modifying the VNF. For example, the service assurance module of cloud resource 260 may determine (e.g., based on performing local analytics) modification information associated with the VNF, and may provide the modification information to the service management module of cloud resource 260. The service management module may receive the modification information, may determine stored information associated with the VNF (e.g., when the service management module is configured to store context information and/or provisioning details, associated with the VNF, when cloud resource 260 initially creates and inserts the VNF), and may generate a command to modify the VNF based on the modification information and the stored information. The service management module may then issue the command to the infrastructure controller and/or the network controller included in cloud resource 260. The infrastructure controller and/or the network controller may receive the command and may act, accordingly.

In this way, cloud resource 260 may determine whether network services, provided by VNFs running on cloud resource 260, are being adequately provided, and may cause the VNFs to be modified accordingly. In other words, cloud resource 260 may locally manage network services being provided by cloud resource 260.

Although FIG. 6 shows example blocks of process 600, in some implementations, process 600 may include additional blocks, different blocks, fewer blocks, or differently arranged blocks than those depicted in FIG. 6. Additionally, or alternatively, one or more of the blocks of process 600 may be performed in parallel.

Figure 7A:
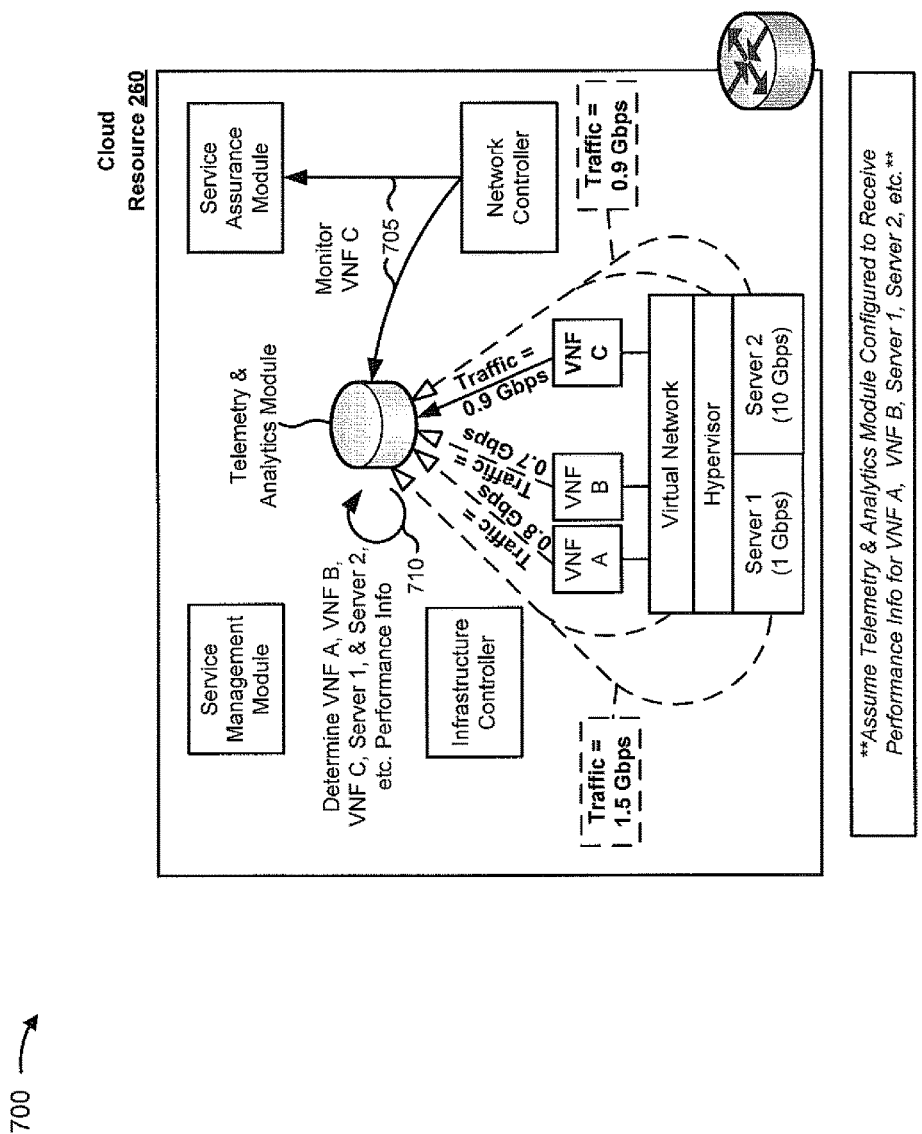
FIGS. 7A and 7B are diagrams of an example implementation relating to the example process shown in FIG. 6.
Figure 7B:
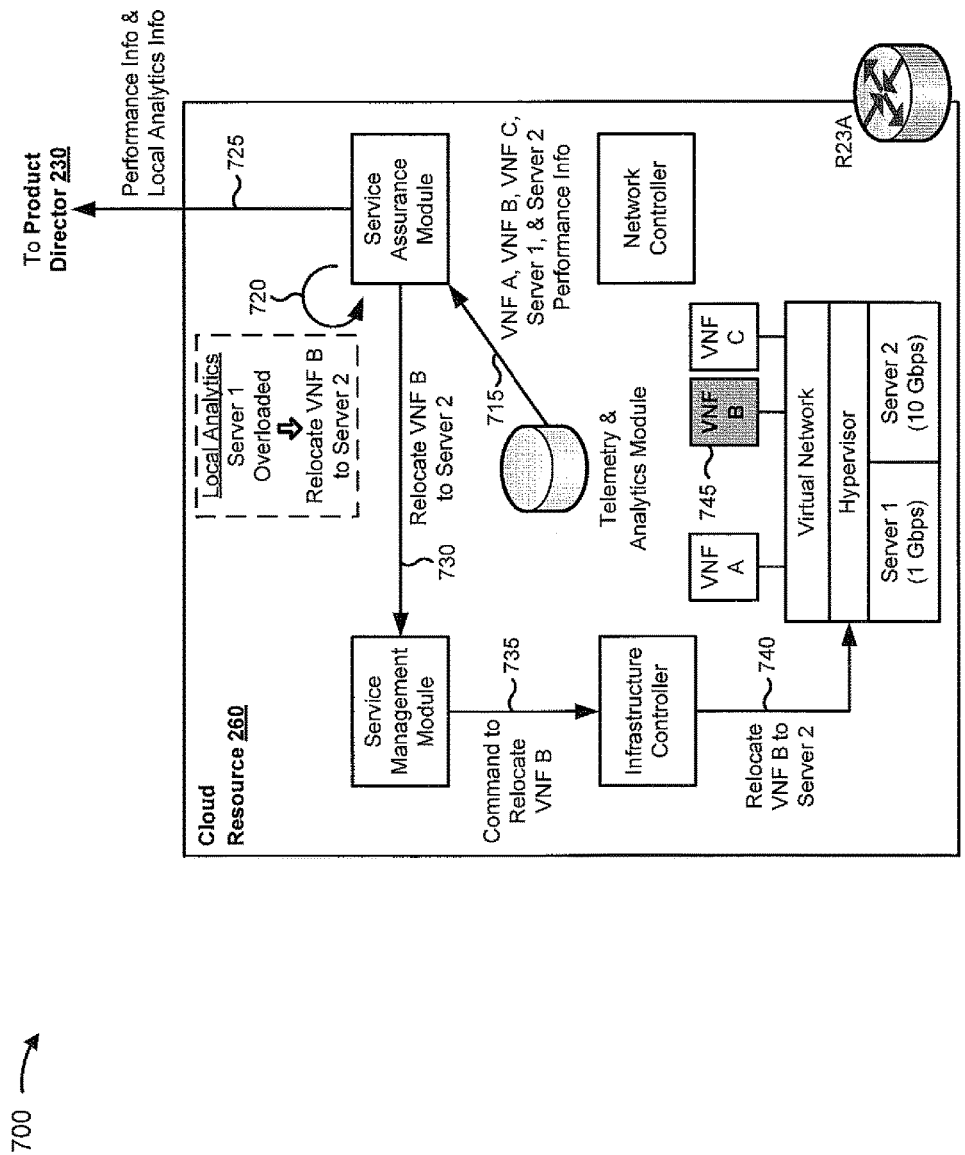

FIGS. 7A and 7B are diagrams of an example implementation 700 relating to example process 600 shown in FIG. 6. For the purposes of example implementation 700, assume that cloud resource 260 hosts two VNFs (e.g., VNF A and VNF B) on a first server device (e.g., server 1 with a capacity of 1 gigabit per second (Gbps)), and that cloud resource 260 hosts one VNF (e.g., VNF C) on a second server device (e.g., server 2 with a capacity of 10 Gbps). Further, assume that VNF A, VNF B, server 1, VNF C, server 2, a hypervisor associated with cloud resource 260, and a virtual network associated with cloud resource 260 are configured to provide performance information, associated with VNF A, VNF B, and VNF C, to a telemetry and analytics module of cloud resource 260. Finally, assume that a network controller of cloud resource 260 has recently inserted VNF C into service provider network 270.

As shown in FIG. 7A, and by reference number 705, the network controller may provide, to the telemetry and analytics module and a service assurance module of cloud resource 260, an indication that that the telemetry and analytics module and the service assurance module should begin to monitor VNF C (e.g., since VNF C was recently created and inserted into service provider network 270). As shown by reference number 710, the telemetry and analytics module may begin to determine performance information associated with VNF C, along with performance information associated with VNF A, VNF B, server 1, server 2, the hypervisor, and the virtual network (e.g., as previously configured).

As shown, the telemetry and analytics module may determine performance information indicating that VNF A traffic is consuming 0.8 Gbps of bandwidth, that VNF B traffic is consuming 0.7 Gbps of bandwidth, that traffic associated with VNF C is consuming 0.9 Gbps of bandwidth, that the total traffic for server 1 traffic uses 1.5 Gbps, and that the total traffic for server 2 uses 0.9 Gbps.

As shown in FIG. 7B, and by reference number 715, the telemetry and analytics module may correlate, aggregate, etc. the VNF A, VNF B, VNF C, server 1, and server 2 performance information, and may provide the performance information to the service assurance module. As shown by reference number 720, the service assurance module may perform, based on the performance information, local analytics to determine local analytics information associated with cloud resource 260. As shown, the local analytics information may indicate that server 1 is overloaded (e.g., since the capacity of server 1 is 1 Gbps and the total traffic required by VNF A and VNF B, both hosted by server 1, is 1.5 Gbps). As further shown, the local analytics information may indicate that VNF B should be relocated to server 2 to assure that network services, associated with VNF A and VNF B, are adequately provided. As shown by reference number 725, the service assurance module may provide, to product director 230, the performance information and the local analytics information (e.g., such that product director 230 may perform global analytics associated with multiple cloud resources 260).

As shown by reference number 730, the service assurance module may also provide, to the service management module, modification information indicating that VNF B is to be relocated to server 2. As shown by reference number 735, the service management module may provide, to the infrastructure controller, a command to relocate VNF B to server 2. In some implementations, the command may include information associated with VNF B (e.g., stored by the service management module). As shown by reference number 740, the infrastructure controller may instruct the hypervisor to relocate VNF B from server 1 to server 2. As shown by reference number 745, the hypervisor may relocate VNF B to server 2. The network controller may then receive a command from the infrastructure controller (e.g., such that VNF B is inserted into service provider network based on being relocated to server 2, in the manner described above).

As indicated above, FIGS. 7A and 7B are provided merely as an example. Other examples are possible and may differ from what was described with regard to FIGS. 7A and 7B.

Implementations described herein may allow virtual network functions, associated with providing network services, to be created and inserted into a service provider network, and may allow the virtual network functions to be locally managed such that the network services are provided in an agile, on-demand, and/or flexible manner without the need to manually configure, monitor, update, etc. devices included in the service provider network.

The foregoing disclosure provides illustration and description, but is not intended to be exhaustive or to limit the implementations to the precise form disclosed. Modifications and variations are possible in light of the above disclosure or may be acquired from practice of the implementations. For example, product director 230 may be capable of simulating the creation and/or insertion of a VNF into the service provider network to determine where a network service will be provisioned without causing the VNF to be created or inserted (e.g., in order to determine pricing information associated with the network service). Similarly, product director 230 may provided with performance information associated with simulated, planned, and/or semi-planned outages associated with one or more cloud resources 260 in order to predict re-distribution of network services among the one or more cloud resources 260.

As used herein, the term component is intended to be broadly construed as hardware, firmware, and/or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A cloud resource, comprising:
a memory; and
one or more processors to:
receive a service request,
the service request being associated with providing a network service for a service location,
the network service being associated with a service provider network,
the service provider network comprising a plurality of devices, and
the service provider network being separate from the cloud resource, and
the service request including:
information identifying a customer, and
configuration information for a virtual network function (VNF) that provides the network service to network traffic destined for the service location;
create, based on the service request, a particular VNF that provides the network service to the network traffic destined for the service location,
the particular VNF being created such that the particular VNF is hosted by a first cloud resource device of the cloud resource, and
the particular VNF being configured with the configuration information;
instruct a routing device of the service provider network to send first traffic, received from a computer network and indicating the service location as a destination, to the first cloud resource device,
the routing device being different from the cloud resource, and
the service location being different from the first cloud resource device;
configure, based on instructing the routing device, the particular VNF to receive, from the routing device and via a first network connection, the first traffic at the first cloud resource device;
configure the particular VNF to provide, based on receiving the first traffic at the first cloud resource device, the network service to the first traffic to produce processed first traffic;
configure, based on providing the network service to the first traffic, the particular VNF to send the processed first traffic to the routing device via the first network connection;
instruct the routing device to send the processed first traffic to the service location,
the processed first traffic being sent to the service location, via a second network connection, after the processed first traffic is sent to the routing device;
perform local analytics based on performance information associated with providing the network service via the particular VNF;
determine, based on performing the local analytics, whether the network service is being provided, via the particular VNF, in accordance with a service level agreement;
determine, based on determining that the network service is not being provided, via the particular VNF, in accordance with the service level agreement, that the particular VNF is to be modified;
relocate the particular VNF to a second cloud resource device, of the cloud resource, based on determining that the particular VNF is to be modified;
instruct, based on relocating the particular VNF, the routing device to send second traffic, from the computer network and destined for the service location, to the second cloud resource device;
configure the particular VNF to provide, based on the second traffic being sent to the second cloud resource device, the network service, to the second traffic to produce processed second traffic; and
configure, based on providing the network service to the second traffic, the particular VNF to send the processed second traffic to the routing device, via the first network connection,
the processed second traffic being sent to the service location, via the second network connection, based on the processed second traffic being sent to the routing device.

2. The cloud resource of claim 1, where the one or more processors are further to:
determine, based on the service request, that the cloud resource has sufficient computing resources available to host the particular VNF; and
where the one or more processors, when creating the particular VNF, are to:
create the particular VNF based on determining that the cloud resource has sufficient computing resources available to host the particular VNF.

3. The cloud resource of claim 1, where the one or more processors are further to:
parse the service request to determine the configuration information; and
where the one or more processors, when creating the particular VNF, are to:
create the particular VNF based on the configuration information.

4. The cloud resource of claim 1, where the one or more processors are further to:
output an indication that the particular VNF was successfully created and inserted into the service provider network.

5. The cloud resource of claim 1, where the particular VNF is a first VNF;
where the performance information is a first performance information received from a first computing device associated with the cloud resource;
where the one or more processors are further to:
receive second performance information associated with a second VNF,
the second performance information being received from a second computing device associated with the cloud resource;
where the one or more processors, when performing the local analytics, are to:
perform the local analytics, based on the first performance information and the second performance information, to determine local analytics information;
where the one or more processors, when determining whether the first VNF is to be modified, are to:
determine, based on the local analytics information, that the first VNF is to be relocated to the second computing device; and
where the one or more processors, when relocating the first VNF to the second computing device, are to:
relocate the first VNF to the second computing device.

6. The cloud resource of claim 5, where the one or more processors are further to:
provide the first performance information, the second performance information, and the local analytics information for determination of global analytics information.

7. A computer-readable medium storing instructions, the instructions comprising:
one or more instructions that, when executed by one or more processors of a cloud resource, cause the one or more processors to:
receive a service request associated with providing a network service for a service location,
the network service being associated with a service provider network,
the service provider network comprising a plurality of devices, and
the service provider network being separate from the cloud resource, and
the service request including:
information identifying a customer, and
configuration information for a virtual network function (VNF) that provides the network service to network traffic destined for the service location;
create, based on the service request, a particular VNF that provides the network service to the network traffic destined for the service location,
the particular VNF being created such that the particular VNF operates on a first cloud resource device of the cloud resource;
instruct a routing device of the service provider network to send first traffic, received from a computer network and indicating the service location as a destination, to the first cloud resource device,
the routing device being different from the first cloud resource device, and
the service location being different from the first cloud resource device;
configure, based on instructing the routing device, the particular VNF to receive, from the routing device via a first network connection, the first traffic at the first cloud resource device based on instructing the routing device;
configure the particular VNF to provide, based on receiving the first traffic at the first cloud resource device, the network service to the first traffic to produce processed first traffic;
configure, based on providing the network service to the first traffic, the particular VNF to send the processed first traffic to the routing device via the first network connection;
instruct the routing device to send the processed first traffic to the service location,
the processed first traffic being sent to the service location, via a second network connection, after the processed first traffic is sent to the routing device;
perform local analytics based on performance information associated with providing the network service via the particular VNF,
determine, based on performing the local analytics, whether the network service is being provided, via the particular VNF, in accordance with a service level agreement;
determine, based on determining that the network service is not being provided, via the particular VNF, in accordance with the service level agreement, that the particular VNF is to be modified;
relocate the particular VNF to a second cloud resource device, of the cloud resource, based on determining that the particular VNF is to be modified;
instruct, based on relocating the particular VNF, the routing device to send second traffic, from the computer network and destined for the service location, to the second cloud resource device;
configure the particular VNF to provide, based on the second traffic being sent to the second cloud resource device, the network service to the second traffic to produce processed second traffic; and
configure, based on providing the network service to the second traffic, the particular VNF to send the processed second traffic to the routing device, via the first network connection,
the processed second traffic being sent to the service location, via the second network connection, based on the processed second traffic being sent to the routing device.

8. The computer-readable medium of claim 7, where the one or more instructions, when executed by the one or more processors, further cause the one or more processors to:
determine, based on the service request, that the first cloud resource device has sufficient computing resources available to provide the network service; and
where the one or more instructions, that cause the one or more processors to create the particular VNF, cause the one or more processors to:
create the particular VNF based on determining that the first cloud resource device has sufficient computing resources available to provide the network service.

9. The computer-readable medium of claim 7, where the one or more instructions, when executed by the one or more processors, further cause the one or more processors to:
output an indication that the particular VNF was successfully created and inserted into the service provider network.

10. The computer-readable medium of claim 7, where the one or more instructions, when executed by the one or more processors, further cause the one or more processors to:
provide the performance information and local analytics information for determination of global analytics information.

11. The computer-readable medium of claim 7, where the particular VNF is a first VNF;
where the performance information is a first performance information received from a first computing device associated with the first cloud resource device;
where the one or more instructions, when executed by the one or more processors, further cause the one or more processors to:
receive second performance information associated with a second VNF,
the second performance information being received from a second computing device associated with the second cloud resource device;
where the one or more instructions, that cause the one or more processors to determine whether the first VNF is to be modified, cause the one or more processors to:
determine, based on the first performance information and the second performance information, that the first VNF is to be relocated to the second computing device; and
where the one or more instructions, that cause the one or more processors to relocate the first VNF to the second computing device, cause the one or more processors to:
relocate the first VNF to the second computing device.

12. A method, comprising:
receiving, by a cloud resource, a service request,
the service request being associated with providing a network service for a service location,
the network service being associated with a service provider network,
the service provider network comprising a plurality of devices, and
the service provider network being separate from the cloud resource, and
the service request including:
information identifying a customer, and
configuration information for a virtual network function (VNF) that provides the network service to network traffic destined for the service location;
determining, by the cloud resource and based on the service request, that the cloud resource has sufficient computing resources available to provide the network service;
creating, by the cloud resource based on determining that the cloud resource has sufficient computing resources available to provide the network service, a particular VNF that provides the network service to the network traffic destined for the service location,
the particular VNF being created such that the particular VNF is hosted by a first cloud resource device of the cloud resource, and
the particular VNF being configured with the configuration information;
instructing, by the cloud resource, a routing device of the service provider network to send first traffic, received from a computer network and indicating the service location as a destination, to the first cloud resource device,
the routing device being different from the first cloud resource device, and
the service location being different from the first cloud resource device;
configuring, by the first cloud resource device based on instructing the routing device, the particular VNF to receive, from the routing device via a first network connection, the first traffic at the first cloud resource device;
configuring, by the cloud resource, the particular VNF to provide, based on receiving the first traffic at the first cloud resource device, the network service to the first traffic to produce processed first traffic;
configuring, by the cloud resource based on providing the network service to the first traffic, the particular VNF to send, via the first network connection, the processed first traffic to the routing device;
instructing, by the cloud resource, the routing device to send the processed first traffic to the service location,
the processed first traffic being sent to the service location after the processed first traffic is sent to the routing device;
performing, by the cloud resource, local analytics based on performance information associated with providing the network service via the particular VNF,
determining, by the cloud resource and based on performing the local analytics, whether the network service is being provided, via the particular VNF, in accordance with a service level agreement;
determining, by the cloud resource and based on determining that the network service is not being provided, via the particular VNF, in accordance with the service level agreement, that the particular VNF is to be modified;
relocating, by the cloud resource, the particular VNF to a second cloud resource device, based on determining that the particular VNF is to be modified;

instructing, by the cloud resource, the routing device to send second traffic, from the computer network and destined for the service location, to the second cloud resource device;

configuring, by the cloud resource, the particular VNF to provide, based on the second traffic being sent to the second cloud resource device, the network service, to the second traffic to produce processed second traffic; and configuring, by the cloud resource based on providing the network service to the second traffic, the particular VNF to send the processed second traffic to the routing device, via the first network connection,
the processed second traffic being sent to the service location, via a second network connection, based on the processed second traffic being sent to the routing device.

13. The method of claim 12, further comprising:
parsing the service request to determine the configuration information; and
where creating the particular VNF comprises:
creating the particular VNF based on the configuration information.

14. The method of claim 12, further comprising:
outputting an indication that the particular VNF was successfully created and inserted into the service provider network.

15. The method of claim 12, where the particular VNF is a first VNF;
where the performance information is a first performance information received from a first computing device associated with the first cloud resource device;
where the method further comprises:
receiving second performance information associated with a second VNF,
the second performance information being received from a second computing device associated with the second cloud resource device;
where performing the local analytics comprises:
performing the local analytics, based on the first performance information and the second performance information, to determine local analytics information;

where determining whether the first VNF is to be modified comprises:
determining, based on the local analytics information, that the first VNF is to be recreated on the second computing device; and
where relocating the first VNF to the second computing device comprises:
relocating the first VNF on the second computing device.

16. The cloud resource of claim 1, where the one or more processors are further to:
cause a configuration of the particular VNF to be modified; and
where the one or more processors, when configuring the particular VNF to provide the network service to the first traffic, are to:
configure the particular VNF to provide the network service to the first traffic, based on the configuration of the particular VNF being modified.

17. The computer-readable medium of claim 7, where the one or more instructions, when executed by the one or more processors, further cause the one or more processors to:
determine the performance information in real-time or on a periodic basis.

18. The cloud resource of claim 1, where the performance information indicates an amount of bandwidth that the particular VNF is consuming.

19. The computer-readable medium of claim 7, where the one or more instructions, when executed by the one or more processors, further cause the one or more processors to:
determine, based on local analytics information, that the first cloud resource device is overloaded, and
instruct a hypervisor to relocate the particular VNF to the second cloud resource device based on determining that the first cloud resource device is overloaded.

20. The method of claim 12, where the network service is provided, via one or more VNFs, to a plurality of service locations.

* * * * *